is not in print
PATENTED MAR. 31, 1836.
9573X
J. SHUGART.
TWYER.
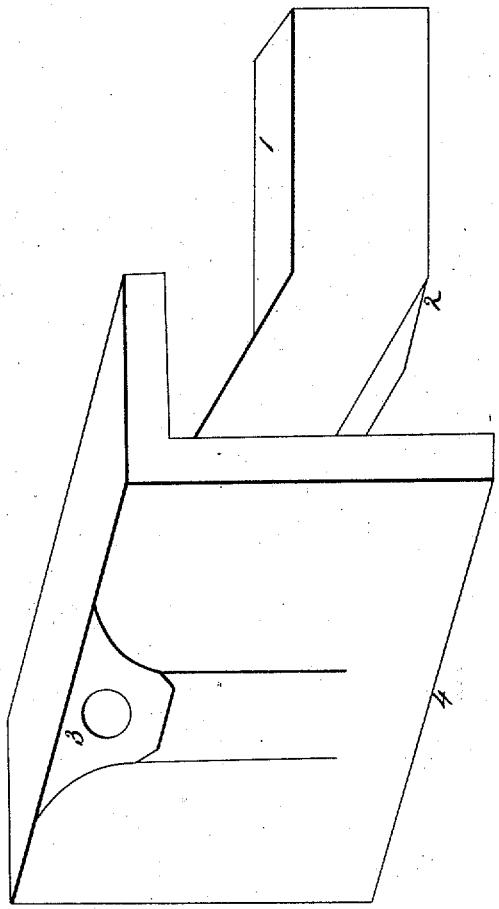

March 31. 1836

John Shugert of the County of Alleghany Penn<sup></sup>.

Letters Patent.

The Schedule referred to in these Letters Patent, and making part of the same, containing a description in the words of the said John Shugert himself, of his improvement in Black Smiths Teu Iron Be it known that I Jno Shugert of the County of Alleghany and State of Pennsylvania have invented a new and useful improvement in the Black Smiths Teu Iron, and the following is an exact description of the construction and operation of sa Teu Iron, as improved by me. The teu Iron, which I have improved, consists in a pipe of about ten or twelve inches in length, the hole through which is about two inches in diameter at the back, and where the bellows pipe is inserted and gradually diminishes to one inch at the other end next the fire. In the entre of said pipe, there is an angle inclining upwards of from twenty to forty five degrees. In place of the collar usually welded on at the end next the fire there is a plate ten inches ong and nine broad, about one inch from the centre of which there is to be an angle of about ninety degrees, the hood part of this angled plate is to have a rise on the face of it at the centre ne inch high and two inches along the plate. The thickness said plate to be about three fourths of an inch. The whole to be made of wrought or cast iron, the pipe and plate is to be put together, so that the straight part of the pipe and the lower edge of the plate, will range in a parallel line. The hole thro the plate for the blast to be in the centre of the rise on the plate, nd to be about three eighths of an inch from the angle. it may e cast all in one piece or put together by rivits &c. &c. It being thus repared is to be set in the forge, the lower part of the pipe nd bottom edge of the plate, to be set level, and so deep that the per edge of the hole for the blast will be about two inches below the general surface of the forge. The back wall to be built up at
the back end of the plate leaving a space between the hole for
the blast and the back wall of five inches. The bellows to be
hung and used as usual.

References to the drawing. 1 The pipe. 2 angles in the
pipe. 3 blast hole. 4 lower edge of plate.

The improvement claimed by the petitioner is the
angles in the pipe and plate by which it is made entirely fire
proof or indestructible.

Witness
Thos St Pillars
Jacob Berger

John Shugert (574 wd.

Exd [illegible]

Patented 31st march 1836

(Rec'd & Recorded anew March 25. 1839)

(Drawing)